(12) United States Patent
Farkhondeh et al.

(10) Patent No.: US 7,844,245 B1
(45) Date of Patent: Nov. 30, 2010

(54) WIRELESS DATA COMMUNICATION ACCESS ACTIVATION

(75) Inventors: Taher Farkhondeh, Danville, CA (US); Cheryl Christine Noti, Marlton, NJ (US); Bhaskar Srinivasiah, Atlanta, GA (US)

(73) Assignee: Cello Partnership, Basking Ridge, NJ (US)

( * ) Notice: Subject to any disclaimer, the term of this patent is extended or adjusted under 35 U.S.C. 154(b) by 822 days.

(21) Appl. No.: 11/482,850

(22) Filed: Jul. 10, 2006

(51) Int. Cl.
H04M 11/00 (2006.01)

(52) U.S. Cl. ...................................... 455/403; 455/434

(58) Field of Classification Search .................. 455/23, 455/403
See application file for complete search history.

(56) References Cited

U.S. PATENT DOCUMENTS

| | | | |
|---|---|---|---|
| 6,829,473 B2 | 12/2004 | Raman et al. | |
| 6,876,644 B1 | 4/2005 | Hsu et al. | |
| 6,950,660 B1 | 9/2005 | Hsu et al. | |
| 2002/0052211 A1* | 5/2002 | Kim et al. | 455/461 |
| 2004/0028055 A1 | 2/2004 | Madour et al. | |
| 2004/0029567 A1* | 2/2004 | Timmins et al. | 455/412.1 |
| 2004/0073786 A1 | 4/2004 | O'Neill et al. | |
| 2004/0106393 A1 | 6/2004 | Chowdhury et al. | |
| 2004/0229614 A1* | 11/2004 | Kim et al. | 455/435.1 |
| 2004/0235455 A1* | 11/2004 | Jiang | 455/411 |
| 2006/0205429 A1* | 9/2006 | Ryoo | 455/518 |
| 2006/0211412 A1* | 9/2006 | Vance | 455/418 |
| 2008/0164304 A1* | 7/2008 | Narasimhan et al. | 235/375 |

* cited by examiner

Primary Examiner—Yuwen Pan
Assistant Examiner—Ankur Jain
(74) Attorney, Agent, or Firm—McDermott Will & Emery LLP

(57) ABSTRACT

Quick wireless access for data network communication is provided to a data device by provision of an access management unit incorporated in the data device. A default network access identifier (NAI), unique to the data device, permits limited access to a wireless network provider's provisioning platform so that the device can be authenticated and access to a data network authorized for a preset service period. Replenishment for a new service period may be provided.

11 Claims, 3 Drawing Sheets

WIRELESS DATA COMMUNICATION ACCESS ACTIVATION

TECHNICAL FIELD

The present disclosure relates to wireless data communication, more particularly to providing quick wireless data communication access to a data device that lacks a pre-assigned mobile directory number.

BACKGROUND

Typically, access to a data network, such as the Internet, is provisioned through a line connection to a PC via a modem or the like from a network node at the user's premises. Service agreements ordinarily provide for relatively long set periods of access authorization, which may readily be renewed in advance. A desktop user is afforded unlimited use during the subscription period.

As connection is identified with a single premises site, a subscriber who is in need of data communication at another location must obtain alternative provisioning. Although the subscriber may have a laptop usable at remote locations, provision still must be made for acquiring data communication access at each location at which data access is required. Hotels commonly offer connection to the Internet for a fee per day, which may suit the users' needs if restriction to the single hotel premises is acceptable. If the user is traveling, however, access must be engaged at each location at which data communication is required.

So-called "internet cafes," in which an internet connection can be rented for short intervals, have become commonplace. As the number of ports are limited, expectation of availability of a connection at a particular time is not guaranteed. These establishments generally are crowded and lacking in privacy. As in the hotel example, use is restricted to a single premises. A user must identify such premises and travel to an identified site whenever access is desired.

Laptops and other data devices more recently have been equipped with wireless communication capability. Service agreements with wireless network providers for internet access typically cover lengthy, for example, yearly, periods. The subscriber can thus obtain internet access at any remote location at which the wireless network is available. For a user whose need for data communication at a remote location is a rare occurrence, such a wireless subscription is unnecessary for most of the subscription period and thus unreasonably expensive. Moreover, the typical administration process for registering a new subscription would be significantly inconvenient to a user seeking to obtain immediate data network access for only the next day or so.

The need thus exists for obtaining, quickly and conveniently, inexpensive wireless data communication access for use during one or more short periods. Desirably, authorization for such access should be obtained simply, without the need for a customer care representative.

SUMMARY OF THE DISCLOSURE

The subject matter described herein fulfills the above-described needs of the prior art. Quick wireless access for data network communication is provided to a data device, such as a portable PC, with provision of an access management unit incorporated in the data device. A default network access identifier (NAI), unique to the data device, permits limited access to a wireless network provider's provisioning platform so that the device can be authenticated and access to a data network authorized for a preset service period.

Payment for the service period is arranged during an initial call in which the default NAI is specified. A mobile directory number (MDN) is thereafter assigned by the provider for data network access during the preset period. The MDN is downloaded by the provider to the data device after the data device initiates the next call, using the default NAI, and generates an authorization code.

The pre-set authorization period begins when the first data call is initiated. Thereafter, determination is made of whether a user data call initiation is within the pre-set time period. Connection is immediately made to the data network only if the pre-set service period has not expired. Although data communication calls attempted after expiration of the preset service period are not immediately connected to the data network, the MDN remains assigned to the data device during a grace period in which arrangement may be made for a new access authorization period for the MDN. During the grace period, a new preset access authorization period may be obtained in a call initiated with the assigned MDN. The call is directed to the network provider to establish payment for a new authorization period. After authorization, the next call initiation will start the new authorization period and the grace period for the assigned MDN may be extended.

Upon termination of the grace period, the assigned MDN is disassociated from the data device at the service provider. If the user attempts an Internet call with the MDN after the grace period, the provider system will signal a controller in the data device to delete the MDN from storage in the data device and reset the default NAI. The user may then enter a new service agreement in the manner initially undertaken and obtain a new authorized MDN.

Additional aspects and advantages will become readily apparent to those skilled in this art from the following detailed description, wherein only the preferred embodiments are shown and described, simply by way of illustration of the best mode contemplated of carrying out the invention. As will be realized, the disclosed concepts are applicable to other and different embodiments, and the disclosed details are capable of modifications in various obvious respects. Accordingly, the drawings and description are to be regarded as illustrative in nature, and not as restrictive.

BRIEF DESCRIPTION OF THE DRAWINGS

In the figures of the accompanying drawings, like reference numerals refer to similar elements.

DETAILED DESCRIPTION

Figure 1:
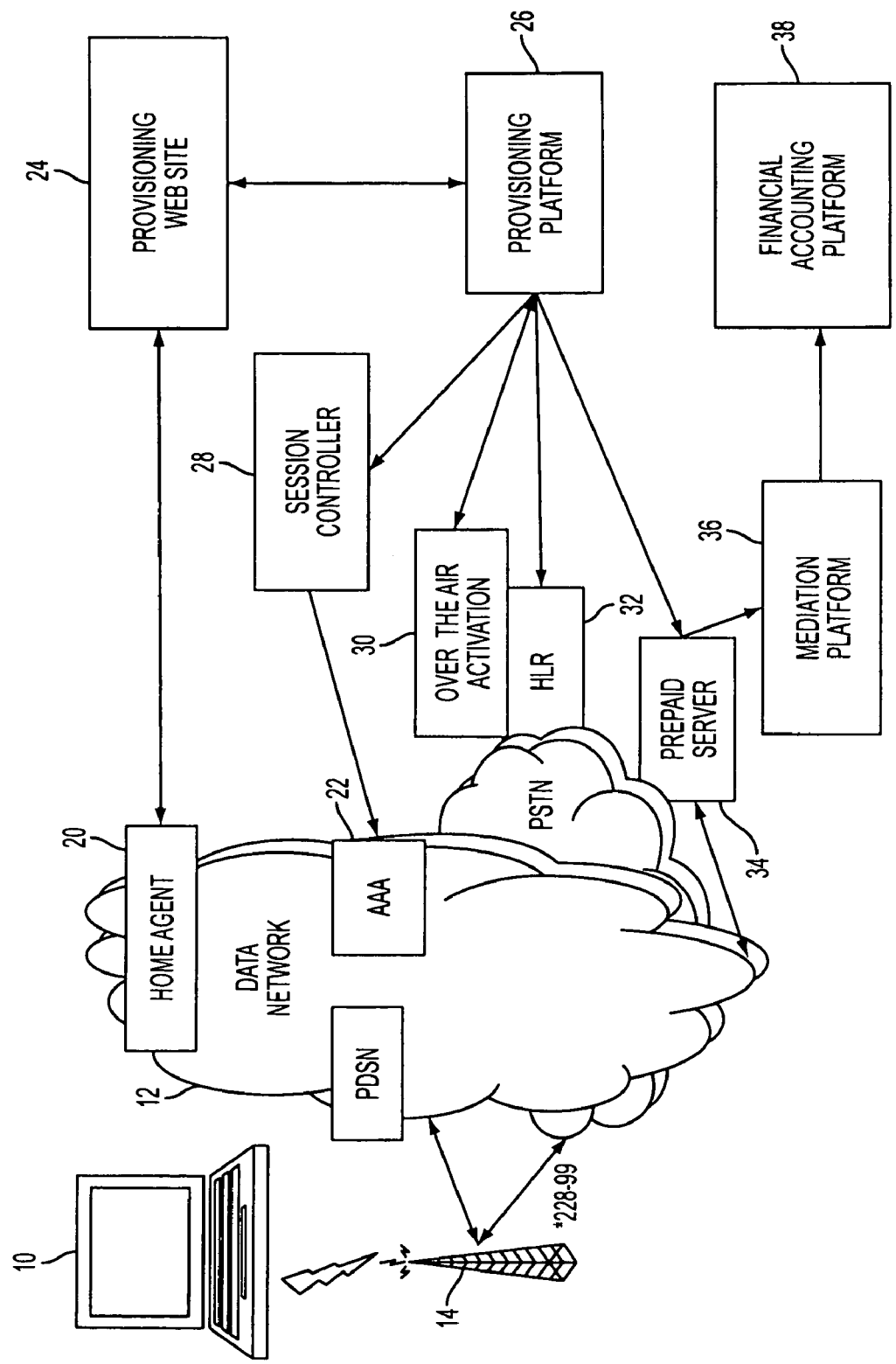
FIG. 1 is a schematic diagram of a communication system in accordance with the present invention.

As shown in the schematically illustrated system of FIG. 1, a customer laptop PC 10 can wirelessly communicate with data network 12 via a mobile communication network, represented by base station 14. Data network 12 includes a mobile telephone data network with appropriate links to the Internet, and other data networks. The mobile communication network is linked to the data network at packet data serving node (PDSN) 18. The data network also includes home agent node 20 and authorization, authentication, accounting (AAA) node 22.

Home agent node 20 provides a link to the service provider's provisioning web site 24 for communication with provisioning platform 26, which is a mobile telephone administrative system. Provisioning platform 26 is linked to well-known elements of the mobile communication system, including session controller 28, over the air activation platform 30, home location register (HLR) 32, prepaid server 34, mediation platform 36 and financial accounting platform 38.

Figure 2:
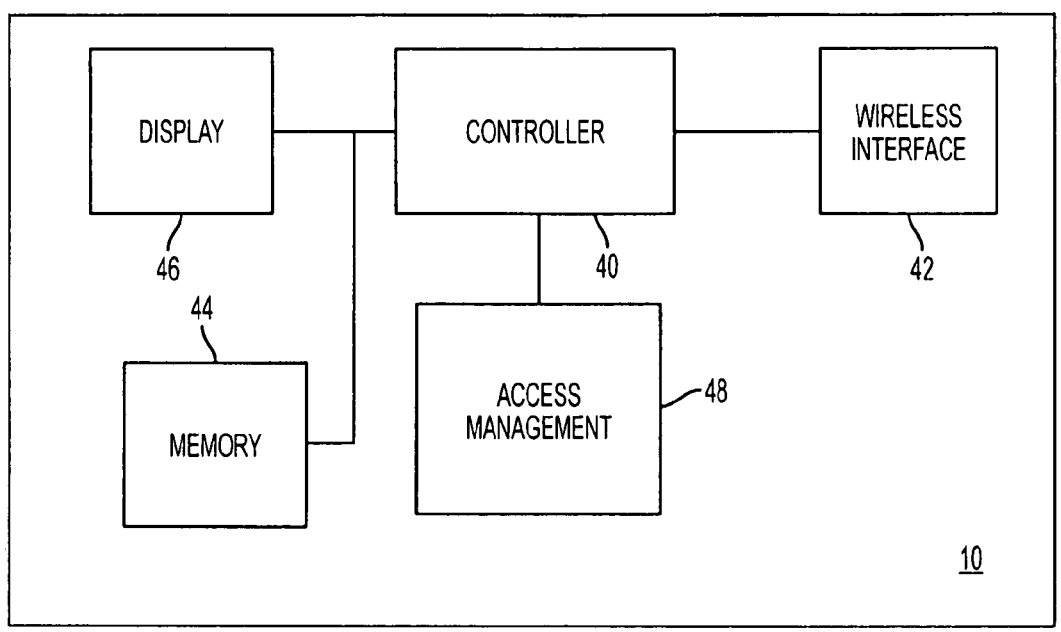
FIG. 2. is a block diagram of a user device with access management implementation in accordance with the present invention.

Laptop 10 contains a card or module that provides client access manager functionality. The access manager unit software may be originally embedded in a chipset in the PC by the manufacturer or may be provided in a PCMCIA card, or the like, purchased by the customer. FIG. 2 is a block representation of the user PC 10. Controller 40 is coupled to wireless interface 42, memory 44, display 46 and access management unit 48.

A network access identifier (NAI) that is unique to the individual PC is stored in memory 48. The NAI may include, for example, the electronic serial number of the device in an alphanumeric address to the provisioning website. No subscription information is stored in memory, as the service may be made available to any user of the device. Application of the NAI is directed only to provisioning website 24 via the home agent 20. AAA node 22 matches the NAI with stored addresses and signals the home agent to assign a quick access protected IP address, whereby the user can reach the provisioning website.

An access manager icon may be provided on the PC display for broadband access. To initiate provisioning of Internet service, the user will select this icon. Other known selection means, such as menu selection, may be provided. In response to the user selection, controller 42 will access memory 48 for the network access identifier and transmit the NAI via wireless interface 46. Upon connection to the provisioning website, the user may be given several options. Options may include, for example, a prepaid twenty-four hour session or other authorization periods such as, for example, one month. A twenty-four hour session would start upon the first initiation of broadband access.

Post paid options may also be available. The provisioning platform will obtain relevant user personal and purchase selection information for payment, for example, credit/debit card information, necessary for account creation. The provisioning website will then send a message for display on the laptop to drop the present connection and restart with the access manager after a short, for example, fifteen minute period.

During this period, received information is verified and the provider will set up an assigned mobile directory number (MDN) for the device. The system will populate the various appropriate databases with the MDN for the user device. Thereafter, the user can restart the access manager with the NAI. An over-the-air activation code, such as the illustrated code "228-99," is transmitted by the access manager to receive the MDN and obtain service activation. The MDN is sent via session controller 28, over-the-air activation platform 30, HLR 32, and prepaid server 34 (if the prepaid option has been engaged), to the user device to be downloaded to storage in memory 48 of the access manager. The device can then be used to access the Internet.

For a twenty-four hour service plan, for example, upon initiation by the user of the first Internet call, a twenty-four hour timer is started in session controller 28, which communicates with AAA 22 to assign a true NAI which will be associated with a standard general use IP address. If the prepay option has been selected, a twenty-four hour token plan is set for the customer in the prepaid server. Expiration of the period will be reflected by token processing in the prepaid server as well as in the session controller 28. AAA 22 will then reset the device's NAI to tear down the service. Any ongoing data session will remain open until the user terminates the session.

Data session attempts thereafter are directed to the online provisioning website in response to the reset NAI that has been associated with the user MDN. Additional user periods can be established after plan selection and payment verification. After an extended period of user inactivity, for example, 60 days, the system will reassign the MDN for availability to another user. The access manager will delete the MDN from storage upon receipt of a signal from the provider if use is attempted after expiration of the predetermined inactivity period.

Figure 3:
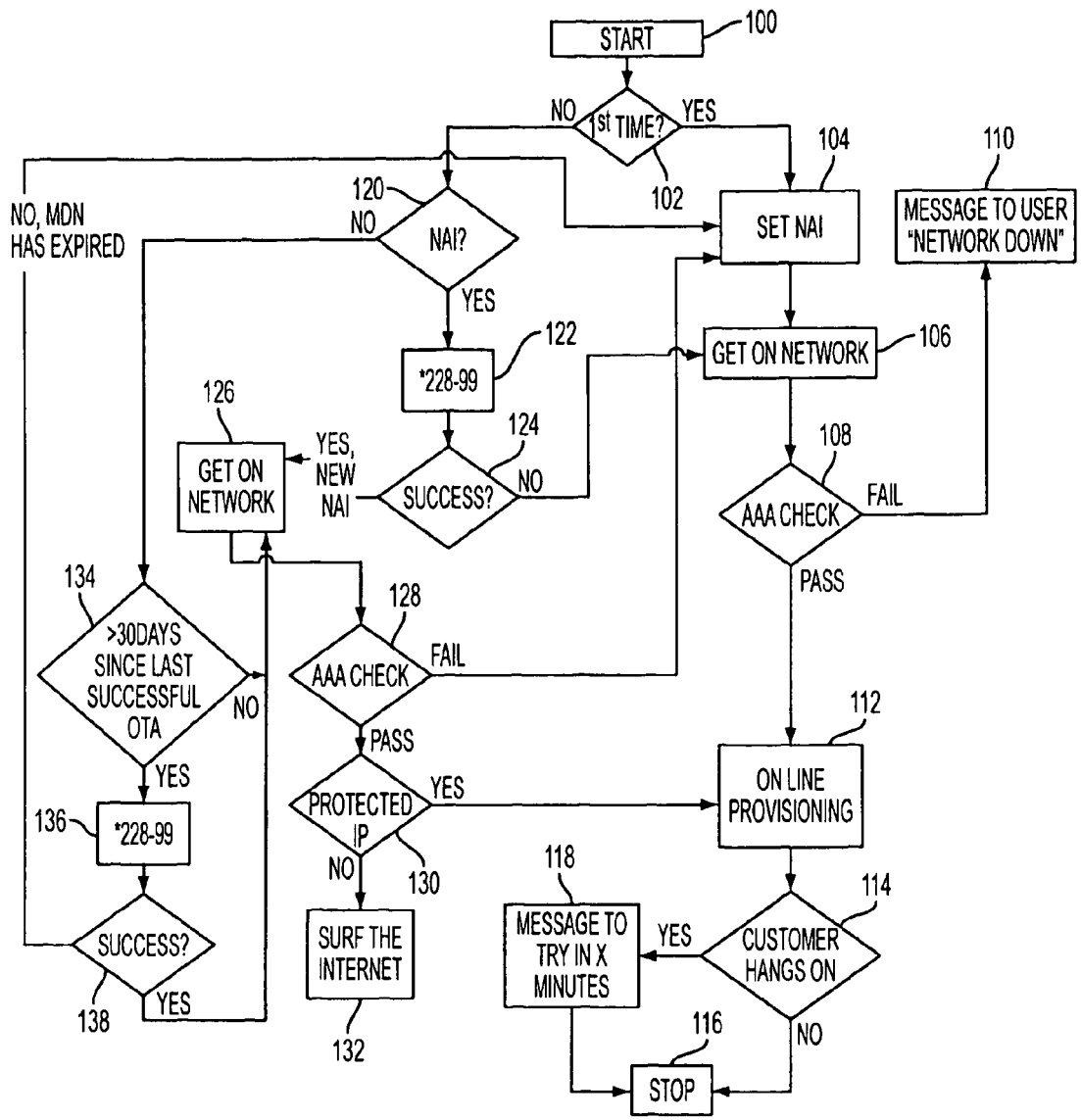
FIG. 3 is a flow chart for operation of the system of FIG. 1.

FIG. 3 is a flow chart of system operation. At step 100, the user selects the access manager software at the laptop to obtain Internet access. The access manager determines whether this selection is a first time selection at step 102. If so, at step 104 the access manager will set and store an NAI that may include the electronic serial number of the device in combination with a number. The NAI is used at step 106 to get to data network 12 via the mobile wireless network. At step 108, AAA 22 checks for a database match with the NAI to confirm that the NAI is associated with the access manager provisioning system. If the check fails, a message is sent to the user indicating, for example, that the user network is down. If the check passes, connection is made to the provisioning web site at step 112. The necessary information is obtained from the user for establishing an Internet access plan. At step 114, a check of payment information is made while the user remains connected. If the check at step 114 fails, the connection is terminated at step 116. If payment information is accepted, a message is sent to the user at step 118 stating that the current session will be terminated and requesting that the user can try to gain Internet access after a waiting period, for example, of fifteen minutes. The connection is then terminated. During the waiting period, the system will assign an MDN for the user device and populate the various appropriate databases with the assigned MDN.

The access manager application is closed in the laptop in step 116 and then restarted by the user, the flow chart reverting to step 100, after the period indicated in step 118. The access manager, at step 102, now determines, from stored memory data, that this selection is not a first time selection. At step 120, the access manager determines that the original default NAI is stored, which indicates that service is not currently activated. The manager automatically dials the over-the-air service activation code, 228-99, at step 122, to obtain an MDN for the device. At step 124, determination is made that the MDN has been assigned to the user device and downloaded to be stored in memory 44.

If, however, the MDN has not been assigned and received within a certain time period, the determination in step 124 is not successful, and the process flow reverts to step 106 to continue the provisioning process. The provisioning platform can use the customer information previously obtained and again instruct the user, at step 118, to retry after another period in which it will assign an MDN and IP address for the user device through AAA 22.

If the MDN is successfully obtained at step 124, the MDN is applied to get on the data network again at step 126. AAA 22 will then check for a valid MDN at step 128. If no valid MDN is found, the process flow reverts to step 104, wherein the access manager again sets the default NAI. If a corresponding a valid MDN is found by AAA 22, the home agent will assign a general IP address which is then used to initiate an Internet session at step 132. After termination of the Internet session, the user may again access the service manager for a new session during the service plan period.

A grace period of, for example, sixty days may be applied for retention of the MDN upon termination of the service plan period or upon termination of a successful on-the-air activation session that extends beyond the service plan period. The MDN will remain associated with the user, regardless of whether there is a current service contract, before being reassigned to a different subscriber after the grace period ends.

After termination of the Internet session, the user may again activate the access manager for another Internet session. Upon determination at step 120 that the MDN, not the initially stored NAI, has been used to initiate the session, a check is made at step 134, to determine whether an arbitrary period of, for example thirty days, has been exceeded since the last over-the-air activation. If not, connection is made to the network at step 126. AAA 22 will communicate with the session controller 28 at step 128 to determine whether the service plan period is still in effect. If the service plan period has not yet expired, the home agent will assign a general IP address for the new session at step 130 and connection to the Internet is provided at step 130.

If the check at step 128 indicates that the MDN is valid but that the subscription period has expired, the home agent, at step 130, will then assign a protected IP address for the new session. The protected IP address can be used only to connect with the provisioning website portal. The process flow is diverted back to step 112 to the provisioning website to permit replenishment of the service for a new period.

If it is determined by the access manager at step 134 that the call is within the grace period but beyond the arbitrary thirty day period, the access manager will generate the on-the-air activation code at step 136, which is transmitted to the data network. At step 138, the network provider determines whether or not the grace period has expired; that is, whether or not the MDN is still assigned to the user device. If the grace period is still in effect, the determination is successful and the process continues to step 126, wherein a valid MDN is determined by AAA and a protected IP address is applied by the home agent at step 130 to route the call to the provisioning site per step 112 to undertake replenishment of the service for a new period.

If the user seeks Internet access after expiration of the grace period, i.e., after sixty days in this example, the check by the network provider at step 138 will recognize that the MDN is no longer assigned to the user device. The network provider will then signal the user device to delete the MDN from memory and divert the process flow to step 104. Upon deleting the MDN from memory the restricted NAI is again set, and the process proceed as if a first time attempt for service has been made.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the arbitrary thirty day period within the grace period in the above described process is an administrative convenience. The period set in step 134 may be adjusted to a different value. Step 134, for example, may be applied to check for a period equal to the grace period.

In other variations, subscribers may be given the ability to view on the device display time left on their subscriptions, in increments as low as seconds. An alert may be issued when the service period is near expiration. Subscribers may be given the opportunity to convert subscription to a greater period such as, for example, a yearly contract. The mediation platform and financial accounting platform ensure that the prospective subscriber is not credit challenged.

What is claimed is:

1. A method for activating wireless data communication service, the method comprising the steps of:
    formulating a network access identifier (NAI) that is exclusive to a data device, the NAI supporting only communication service access for service provisioning with a network service provider;
    receiving a first wireless call by the data device to the network service provider, the first wireless call using the formulated NAI without using a MDN for the data device, the data device lacking a pre-assigned mobile directory member (MDN);
    establishing payment to the network service provider for data communication service for the data device, during the first call;
    assigning a MDN for authorized data communication for the data device by the network provider for a pre-set service time period;
    terminating the first call;
    initiating a second wireless call by the data device to the network service provider using the formulated NAI;
    entering an authorization code by the data device;
    downloading the assigned MDN from the network provider to the data device, to provision the data device to use the assigned MDN for authorized data communication for the pre-set service time period, wherein the pre-set service time period commences after the downloading, wherein the step of downloading the assigned MDN is responsive to the entry of the authorization code by the data device;
    sensing when initiation of an additional data call occurs;
    determining whether the sensed additional data call initiation occurrence is within the pre-set service time period;
    connecting the additional data call for network communication only if time of the pre-set service time period has not expired;
    maintaining assignment of the MDN to the data device for a grace time period in excess of the pre-set service time period; and
    canceling the assignment of the MDN to the data device based upon expiration of time of the grace time period.

2. The method as recited in claim 1, wherein the pre-set service time period commences at initiation of a first data communication by the data device to occur after the downloading step.

3. The method as recited in claim 1, wherein the pre-set service time period commences at initiation of a first data communication by the data device to occur after the downloading step.

4. The method as recited in claim 1, further comprising limiting communication use for the assigned MDN to data communication use.

5. The method as recited in claim 4, wherein the data communication use comprises wireless connection of the data device to the Internet.

6. The method as recited in claim 1, further comprising a step of reauthorizing use of the assigned MDN by the data device for data communication during a portion of the grace time period that is subsequent to expiration of the pre-set service period.

7. The method as recited in claim 6, wherein the step of reauthorizing the assigned MDN comprises:

determining that another additional data call using the assigned MDN is initiated within the grace time period but after expiration of the pre-set service time period;

in response to the grace time period determination, receiving the other additional call at the network provider; and establishing payment for a new authorized pre-set service time period.

8. The method as recited in claim 7, further comprising steps of:

terminating the other additional data call; and extending the grace time period for the assigned MDN.

9. The method as recited in claim 1, wherein the step of canceling comprises:

disassociating the assigned MDN from the data device at the service provider; and deleting the MDN from storage in the data device during an attempted initiation of a data call by the data device after expiration of the grace time period.

10. The method as recited in claim 1, wherein:

the formulated NAI is a default call originating number stored in the data device, and calls initiated with the formulated NAI are directed only to a provisioning site of the service provider.

11. A system for providing wireless access for data network communication, the system comprising:

a data device comprising a controller, a wireless interface for data network communication, storage, and an access management program and a network access identifier (NAI) that is exclusive to the data device contained in the storage, the NAI supporting only communication service access for service provisioning with a network service provider; and a provisioning network for authorizing and activating the data device for wireless access to a data network, the provisioning network being configured to:

(a) receive a first wireless call by the data device to the network service provider, the first wireless call using the NAI without using a mobile directory number (MDN) for the data device, the data device not yet having an assigned MDN;

(b) establish payment to the network service provider for data communication service for the data device, during the first call;

(c) assign a MDN for authorized data communication for the data device by the network provider for a pre-set service time period;

(d) terminate the first call, receive a second wireless call by the data device to the network service provider using the NAI and receive an authorization code entered by the data device;

(e) responsive to receipt of the authorization code entered by the data device, download the assigned MDN from the network provider to the storage in the data device, to provision the data device to use the assigned MDN for authorized data communication during the pre-set service time period, to permit connection of any call for data network communication from the data device as long as time of the pre-set service time period has not expired, wherein the pre-set service time period commences after the download of the assigned MDN;

(f) maintain assignment of the MDN to the data device for a grace time period in excess of the pre-set service time period; and (g) cancel the assignment of the MDN to the data device based upon expiration time of the grace time period.

* * * * *